Sept. 1, 1936.  H. RAABER  2,052,845
BOMB RELEASING GUIDE
Filed Sept. 28, 1934
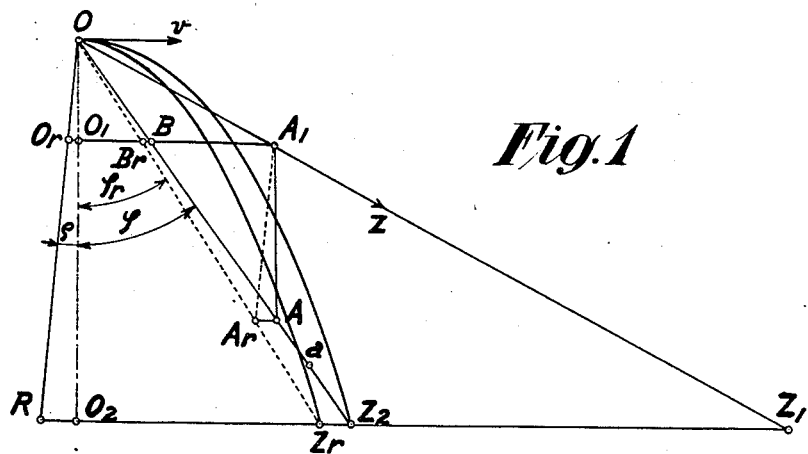
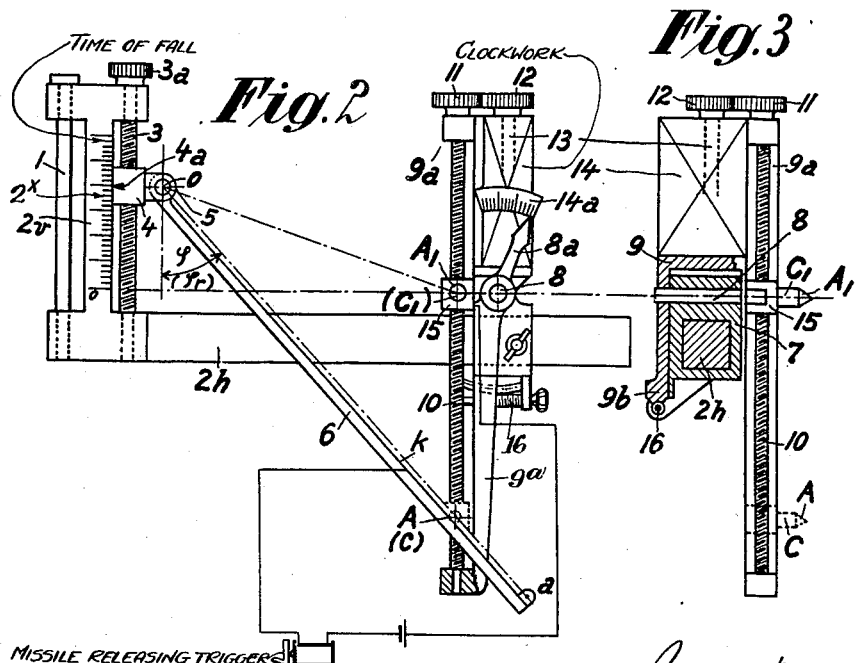

Patented Sept. 1, 1936

2,052,845

UNITED STATES PATENT OFFICE

2,052,845

BOMB RELEASING GUIDE

Hans Raaber, Purkersdorf, near Vienna, Austria, assignor to Actiengesellschaft C. P. Goerz Optische Anstalt Actiova Spolećnost K. P. Goerz opticky ústav, Bratislava, Czechoslovakia, a company of Czechoslovakia Application September 28, 1934, Serial No. 746,022 In Germany October 6, 1933

3 Claims. (Cl. 33—46.5)

The object of the present invention is to determine automatically the moment for releasing missiles from aircraft for a given range angle, so that it is possible to hit the target, after the said range angle has been determined in any suitable way, even if the target is made invisible by clouds or otherwise at the moment of releasing the missile.

According to my invention this object is attained by securing to the side wall of the aircraft a bracket carrying two screw spindles, one being truly vertical, each of the two said spindles carrying a nut locked against rotation. One of the said screw spindles is adapted to be rotated and its nut carries a sight mark hereinafter called the preliminary sight mark. The nut of the other screw spindle carries a sight rule hereinafter called the releasing sight rule. This latter and the preliminary sight mark are so adjusted that when the screw spindle carrying the nut of the preliminary sight is uniformly rotated for a certain time after the preliminary sight mark has come into coincidence with the target, the preliminary sight reaches the releasing sight and this indicates the exact moment at which the missile must be released. I prefer to provide my apparatus with means for compensating for the necessary leading.

A constructional form of the present apparatus is illustrated by way of example in the accompanying drawing. Fig. 1 illustrates diagrammatically the mechanical principle of the apparatus, while Figs. 2 and 3 show an apparatus based on said principle, in side elevation and rear elevation respectively.

In Fig. 1, $OA$ is the releasing sight line determined by any suitable method and is inclined forwardly of the vertical $OO_2$ at the range angle $\phi$, and $O$ is the upper sight mark. Below this sight mark $O$ is arranged at a distance $OO_1$ therefrom a horizontal guide, the distance $OO_1$ being proportional to the time of fall $T$ of the missile, so that $OO_1=cT$, where $c$ is a constant. On this guide a sight mark $A_1$ is adjustably mounted at the required point. When the triangle $A_1OO_1$ is directed towards the target, then at the moment when the target appears in the sight line $OA_1$, a clockwork is thrown into action which causes the sight mark $A_1$ to move downwards at the speed $$c=\frac{OO_1}{T}$$

until, after a period of time $t_z$, said sight mark $A_1$ reaches the releasing line $OA$. From the similarity of triangles it follows that:

$$O_1B:O_2Z_2=OO_1:OO_2=A_1B:Z_1Z_2,$$

$O_2Z_2$ representing $vT$ and $Z_1Z_2$ representing $vt_z$ and therefore $$O_1B:A_1B=vT:vt_z=T:t_z,$$

$v$ being the speed of flight of the aircraft and $t_z$ the time between taking the preliminary sight $OA_1Z_1$ and the releasing sight $OBZ_2$. Furthermore the relation exists that $$OO_1:O_1B=AA_1:A_1B,$$

so that $$AA_1=OO_1\frac{A_1B}{O_1B}=cT.t_z=c.t_z$$

If therefore the preliminary sight mark moves vertically downwards with the speed $$c=\frac{OO_1}{T}$$

then after the lapse of time $t_z$ it comes into coincidence with the releasing sight line, which is located between the position $(Z_1)$ of the target in the preliminary sight and the position $(Z_2)$ of the target in the releasing sight line. Taking into account the trail due to the horizontal component of the resistance of the air, the range angle $\phi_r$ relative to the releasing sight line $OB_rZ_r$ is less than $\phi$, and instead of the similar triangles $OO_1B$ and $AA_1B$, the similar triangle $OO_rB_r$ and $A_1A_rB_r$ must be considered, the parallel sides of which are inclined to the vertical by the trail angle $\rho=ROO_2$. Corrected speeds are obtained therefrom which differ from $c$ in the ratio $\cos \rho:1$, the maximum value of $\rho$ being in practice about 5°.

An apparatus based on this principle is shown in Figs. 2 and 3 as consisting of a rectangular bracket $2_v$—$2_h$ pivotally connected to the side wall of the aircraft by a journal pin $1$. On the vertical arm $2_v$ of said bracket is journalled a vertical screw spindle $3$ on which a nut $4$ carrying an adjustment mark $4a$ is locked against rotation. By turning the screw spindle $3$ by means of the knob $3a$, the nut $4$ may be adjusted according to a given time of falling relative to a scale $2_x$ on the vertical bracket arm $2_v$. The nut $4$ carries a bearing for a journal pin $5$ having a point $O$ serving as an upper sight mark. Around this pivot pin $5$ revolves the releasing sighting rule $6$ provided at its lower end with a lower sighting mark $a$. The sighting rule $6$ is adapted to be turned by any preliminary sighting device not shown through the range angle $\phi$ (or $\phi_r$) relatively to the vertical, whereupon it may be fixed in position. The range angle may be determined in suitable manner as for example, by the use of the apparatus shown in my copending application Serial No. 746,021 filed on even date herewith, which apparatus shows means for fixing a sighting rule.

On the horizontal arm $2_h$ of said bracket is mounted a slide 7 adapted to be locked in any position. To this slide is secured a journal pin 8 on which is pivoted a bearing 9. This bearing carries a yoke $9a$ in which is journalled the vertical screw spindle 10 driven by two meshing spur wheels 11, 12 from a shaft 13 of a clockwork 14, which shaft is adapted to be thrown into and out of operation and to be reversed. By so rotating the screw spindle 10, a nut 15 mounted thereon and locked against rotation is moved vertically. This nut carries a pin $C_1$ ending in a sight pin point $A_1$. On the journal pin 8 is mounted a pointer $8a$ which indicates on the scale $14a$ secured to the casing of the clockwork 14 the inclination to the vertical of the combination of parts 9 to 15 and hence also of the screw spindle 10. The angle of this inclination is the trail angle and may be adjusted by the worm wheel segment $9b$ provided on the bearing 9 by turning the worm 16 rotatably mounted on the slide 7.

The operation of this apparatus is as follows:

First by means of the scale on the vertical bracket arm $2_v$, the upper sight mark O is adjusted in accordance with the falling time of the missile. Then the bearing 9, together with the parts connected thereto, is shifted along the horizontal bracket arm $2_h$ to any desired extent and the target Z is watched until it reaches the preliminary sighting line $OA_1$. At this moment the shaft 13 of the clock operates, whereupon the point $A_1$ moves downwards with a constant speed until the preliminary sighting mark $A_1$ reaches the releasing sighting line $Oa$. If, however, the preliminary sighting mark $A_1$ is provided with an electric contact, the release of the missile might be brought about automatically provided the releasing rule 6 carries a contact edge $k$, so arranged that it makes an electric contact when the point $A_1$ reaches the line $Oa$.

What I claim is:

1. Apparatus for automatically indicating the moment for releasing a missile from an aircraft, comprising a vertical journal pin secured to the side wall of the aircraft, a frame rotatable about said journal pin, a preliminary sight mark carried by said frame, and with which the target is preliminarily sighted and followed, means on said frame including a clockwork for approximately vertically moving said preliminary sight mark, means on said frame forming a releasing sight line, and means for adjusting and permanently holding said releasing sight line means in a vertical plane with said preliminary sight mark, so that the moment for releasing the missile is indicated when the preliminary sight mark intersects the releasing sight line.

2. Apparatus for automatically indicating the moment for releasing a missile from an aircraft, comprising, a vertical journal pin secured to the side wall of the aircraft, a frame rotatable about said journal pin, a preliminary sight mark carried by said frame, means on said frame including a clockwork for approximately vertically moving said preliminary sight mark, means on said frame forming a releasing sight line, and means for adjusting and permanently holding said releasing sight line means in a vertical plane with said preliminary sight mark, said preliminary sight mark and said releasing sight line forming electric contact elements adapted to engage with each other at the proper instant of release.

3. Apparatus for automatically indicating the moment for releasing a missile from an aircraft, comprising a vertical journal pin secured to the side wall of the aircraft, a frame rotatable around said journal pin, a preliminary sight mark carried by said frame, means on said frame including a clockwork, a screw spindle rotated by said clockwork, a nut mounted on said screw spindle, means for holding said nut against rotation, and means for pivoting said screw spindle in a vertical plane in the direction of flight according to the trail angle, means on said frame forming a releasing sight line, and means for adjusting and permanently holding said releasing sight line means in a vertical plane with said preliminary sight mark.

HANS RAABER.